United States Patent
Abedini et al.

(10) Patent No.: US 12,289,694 B2
(45) Date of Patent: Apr. 29, 2025

(54) METHODS AND APPARATUS FOR FREQUENCY SYNCHRONIZATION COMMUNICATION

(71) Applicant: QUALCOMM Incorporated, San Diego, CA (US)

(72) Inventors: Navid Abedini, Somerset, NJ (US); Luca Blessent, Whitehouse Station, NJ (US); Jianghong Luo, Skillman, NJ (US); Alessio Marcone, Nuremberg (DE); Valentin Alexandru Gheorghiu, Yokohama (JP); Karl Georg Hampel, Hoboken, NJ (US); Muhammad Nazmul Islam, Littleton, MA (US); Tao Luo, San Diego, CA (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 96 days.

(21) Appl. No.: 17/001,313

(22) Filed: Aug. 24, 2020

(65) Prior Publication Data

US 2021/0153145 A1 May 20, 2021

Related U.S. Application Data

(60) Provisional application No. 62/937,186, filed on Nov. 18, 2019.

(51) Int. Cl.
*H04W 56/00* (2009.01)
*H04W 72/51* (2023.01)
*H04W 72/542* (2023.01)

(52) U.S. Cl.
CPC ......... *H04W 56/001* (2013.01); *H04W 72/51* (2023.01); *H04W 72/542* (2023.01)

(58) Field of Classification Search
CPC ........... H04W 56/001; H04W 56/0015; H04W 56/0035; H04W 72/048; H04W 72/085
See application file for complete search history.

(56) References Cited

U.S. PATENT DOCUMENTS

| | | | | |
|---|---|---|---|---|
| 5,878,091 A | * | 3/1999 | Retzer | ................... H04L 25/068 375/340 |
| 5,913,171 A | | 6/1999 | Solonen et al. | |

(Continued)

FOREIGN PATENT DOCUMENTS

| | | | | |
|---|---|---|---|---|
| EP | 2224606 A1 | * | 9/2010 | ............. G01S 11/10 |
| EP | 2654258 A2 | | 10/2013 | |

(Continued)

OTHER PUBLICATIONS

International Search Report & Written Opinion dated Feb. 18, 2021 from corresponding PCT Application No. PCT/US2020/056795.

(Continued)

*Primary Examiner* — Kenny S Lin
*Assistant Examiner* — Rodrick Mak
(74) *Attorney, Agent, or Firm* — ArentFox Schiff LLP

(57) ABSTRACT

The present disclosure relates to methods and devices for wireless communication at a wireless device or integrated access and backhaul (IAB) node. In one aspect, the wireless device may determine a frequency synchronization accuracy for the wireless device. The wireless device may also transmit an indication of the determined frequency synchronization accuracy for the wireless device. Additionally, the wireless device may determine an absolute frequency based on a combination of measurements from at least one synchronization source and a frequency of the wireless device, where the frequency synchronization accuracy is based on the absolute frequency.

21 Claims, 15 Drawing Sheets

(56) References Cited

U.S. PATENT DOCUMENTS

| | | | |
|---|---|---|---|
| 11,184,785 B2 | 11/2021 | Zacharias et al. | |
| 2009/0135956 A1* | 5/2009 | Chan | H03L 7/146 |
| | | | 375/327 |
| 2010/0054237 A1* | 3/2010 | Han | H04W 56/0035 |
| | | | 370/350 |
| 2010/0067507 A1 | 3/2010 | Park | |
| 2014/0126472 A1* | 5/2014 | Siomina | H04W 56/00 |
| | | | 370/328 |
| 2016/0065322 A1* | 3/2016 | Cao | H04J 3/0658 |
| | | | 370/503 |
| 2016/0219544 A1* | 7/2016 | Park | H04L 27/364 |
| 2017/0272131 A1* | 9/2017 | Ananth | H04B 7/0413 |
| 2018/0131487 A1 | 5/2018 | Ly et al. | |
| 2018/0302205 A1 | 10/2018 | Abedini et al. | |
| 2019/0098589 A1* | 3/2019 | Chae | H04W 56/0015 |
| 2019/0335389 A1 | 10/2019 | Lindoff et al. | |
| 2020/0163032 A1* | 5/2020 | Su | H04W 48/12 |
| 2020/0259521 A1* | 8/2020 | Zhao | H04B 1/7136 |
| 2021/0400635 A1* | 12/2021 | Blasco Serrano | H04L 1/1858 |
| 2022/0095278 A1* | 3/2022 | Kim | H04L 27/26 |

FOREIGN PATENT DOCUMENTS

| | | | | |
|---|---|---|---|---|
| JP | 2016510572 A | * | 4/2016 | |
| WO | 2018085682 | | 5/2018 | |
| WO | 2018169663 A1 | | 9/2018 | |
| WO | WO-2021032270 A1 | * | 2/2021 | ........ H04W 52/0212 |

OTHER PUBLICATIONS

NTT Docomo et al: "Mechanism to support the "case-1" OTA timing alignment", 3GPP Draft; RI-1902797 Mechanism to Support the CASE-1 OTA-Timing Alignment Final, 3rd Generation Partnership Project (3GPP), Mobile Competence Centre ; 650, Route Des Lucioles ; F-06921 Sophia-Antipo, vol. RAN WG1, No. Athens, Greece; Feb. 25, 2019-Mar. 1, 2019 Feb. 15, 2019 (Feb. 15, 2019), XP051600492.

Item 2 Continued: Retrieved from the Internet: URL:http://www.3gpp.org/ftp/tsg%5Fran/WG1%5FRL1/TSGR1%5F96/Docs/R1%2D1902797%2Ezip [retrieved on Feb. 15, 2019].

* cited by examiner

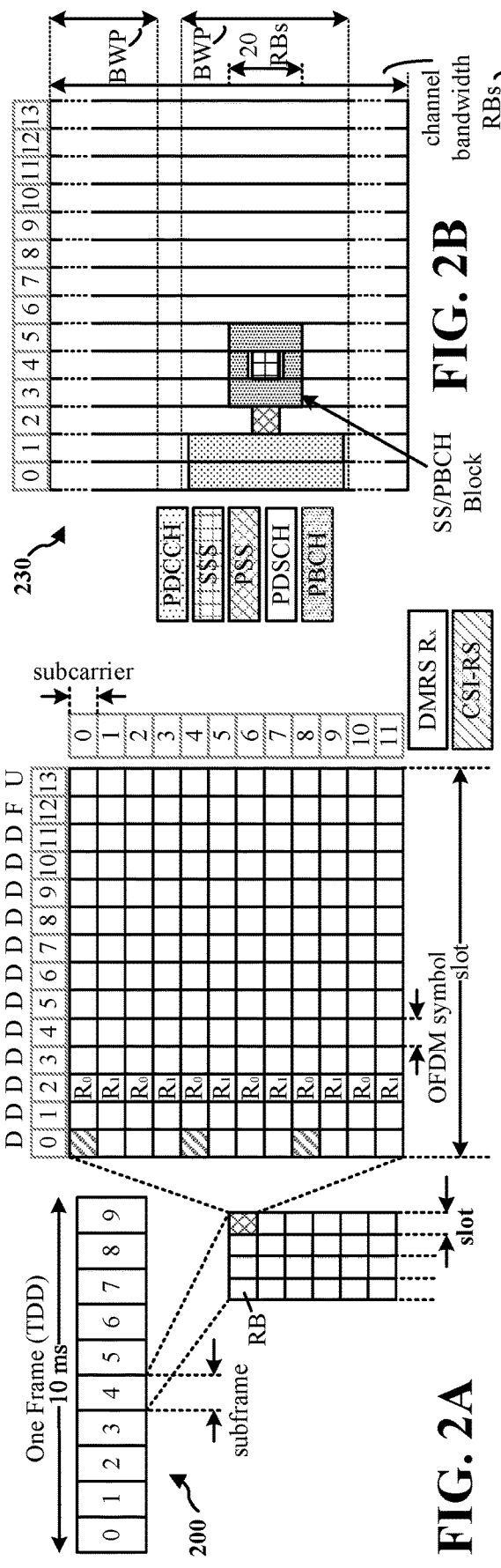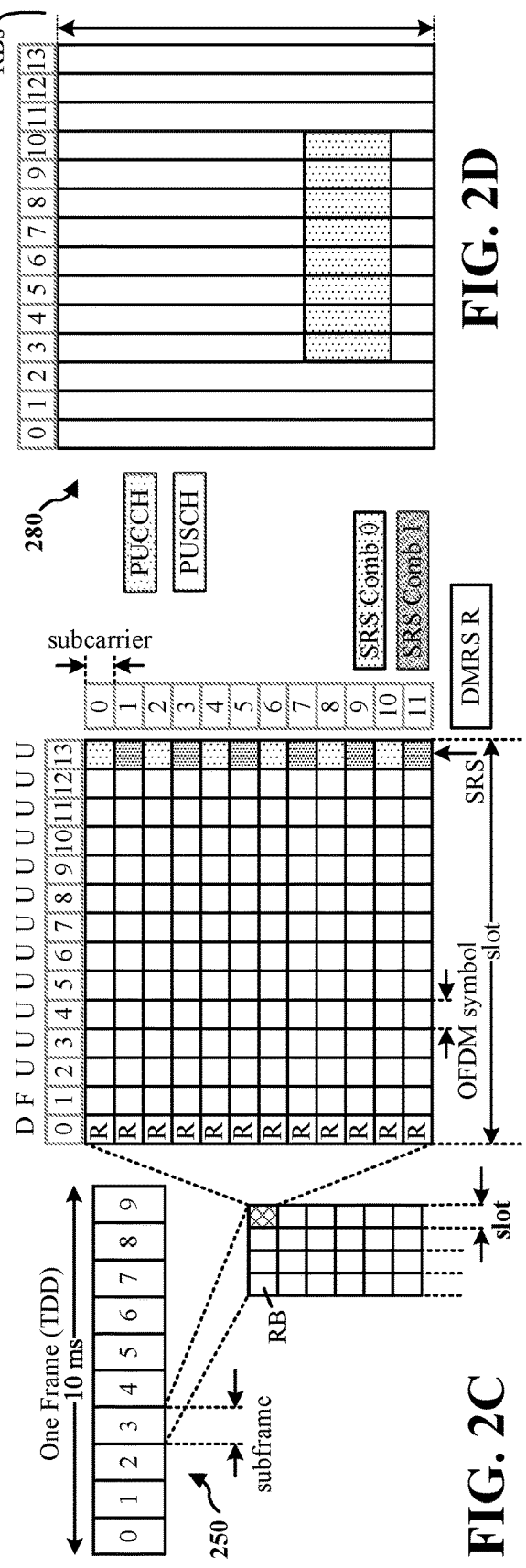

METHODS AND APPARATUS FOR FREQUENCY SYNCHRONIZATION COMMUNICATION

CROSS REFERENCE TO RELATED APPLICATION(S)

This application claims the benefit of U.S. Provisional Application Ser. No. 62/937,186, entitled "METHODS AND APPARATUS FOR FREQUENCY SYNCHRONIZATION COMMUNICATION" and filed on Nov. 18, 2019, which is expressly incorporated by reference herein in its entirety.

BACKGROUND

Technical Field

The present disclosure relates generally to communication systems, and more particularly, to wireless communication including synchronization.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Integrated access and backhaul (IAB) networks may include multiple cells in communication with each other to provide an access network and a backhaul network to a core network.

In an aspect of the disclosure, a method, a computer-readable medium, and an apparatus are provided. The apparatus may be a wireless device. In some aspects, the wireless device may determine a frequency synchronization accuracy for the wireless device. The wireless device may also transmit an indication of the determined frequency synchronization accuracy for the wireless device. Additionally, the wireless device may determine an absolute frequency based on a combination of measurements from at least one synchronization source and a frequency of the wireless device, where the frequency synchronization accuracy is based on the absolute frequency.

In an another aspect of the disclosure, a method, a computer-readable medium, and an apparatus are provided. The apparatus may be a first wireless device. In some aspects, the first wireless device may receive an indication of a frequency synchronization accuracy for a second wireless device. The first wireless device may also perform a frequency synchronization based on a frequency of the second wireless device and using the indication of the frequency synchronization accuracy for the second wireless device.

In an another aspect of the disclosure, a method, a computer-readable medium, and an apparatus are provided. The apparatus may be central entity in a wireless device network. In some aspects, the central entity may receive an indication of a frequency synchronization accuracy from each of a plurality of wireless devices. The central entity may also send frequency synchronization accuracy information for each of the plurality of wireless devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
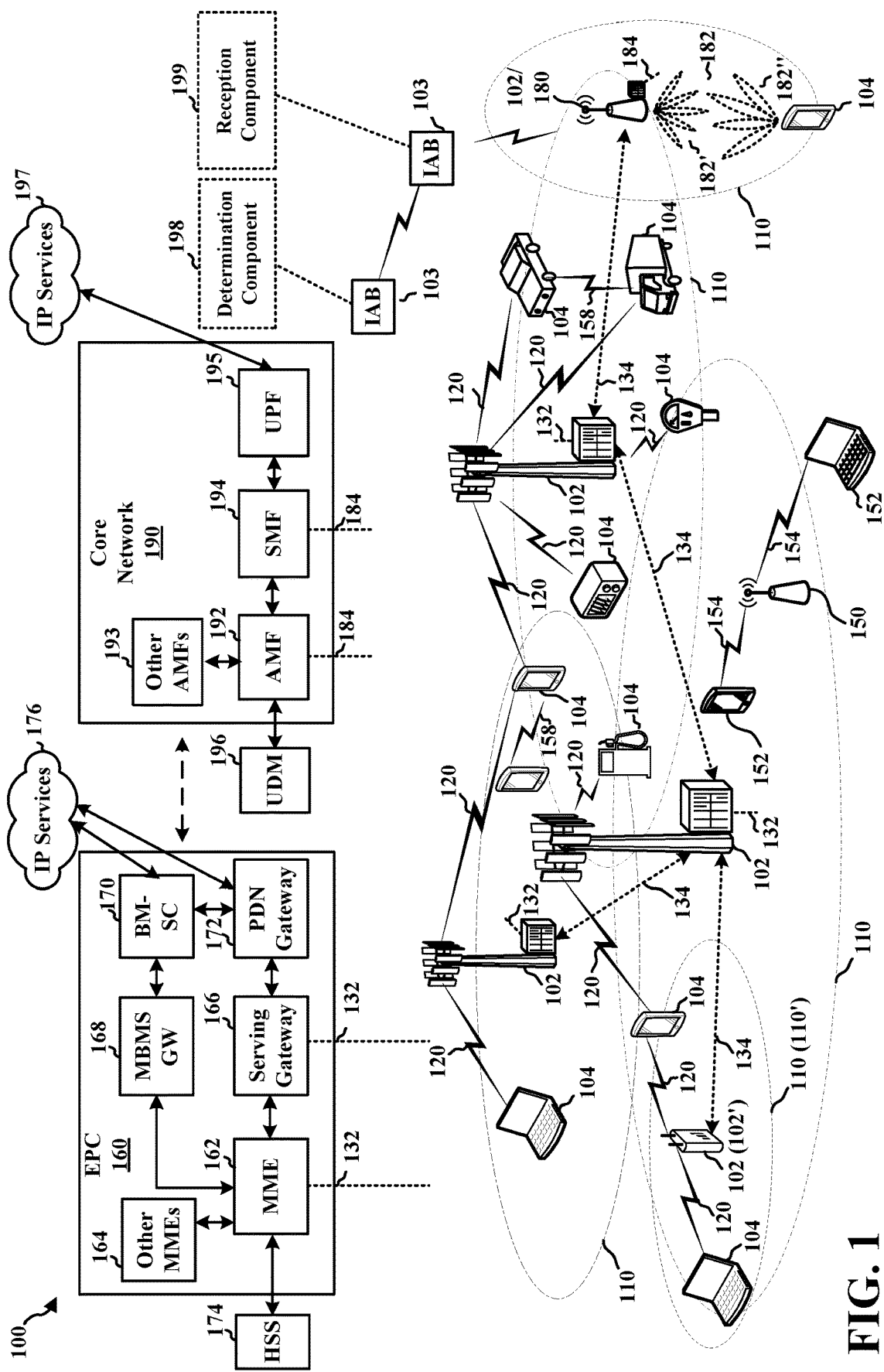
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. In IAB networks, the base station may also be an IAB node 103. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a wireless device (e.g. an IAB node 103) may comprise a determination component 198 configured to determine a frequency synchronization accuracy for the wireless device. Determination component 198 may also be configured to transmit an indication of the determined frequency synchronization accuracy for the wireless device. Determination component 198 may also be configured to determine an absolute frequency based on a combination of measurements from at least one synchronization source and a frequency of the wireless device, where the frequency synchronization accuracy can be based on the absolute frequency.

Referring again to FIG. 1, in certain aspects, a first wireless device (e.g. an IAB node 103) may also comprise a reception component 199 configured to receive an indication of a frequency synchronization accuracy for a second wireless device (e.g. another IAB node). Reception component 199 may also be configured to perform a frequency synchronization based on a frequency of the second wireless device and using the indication of the frequency synchronization accuracy for the second wireless device.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
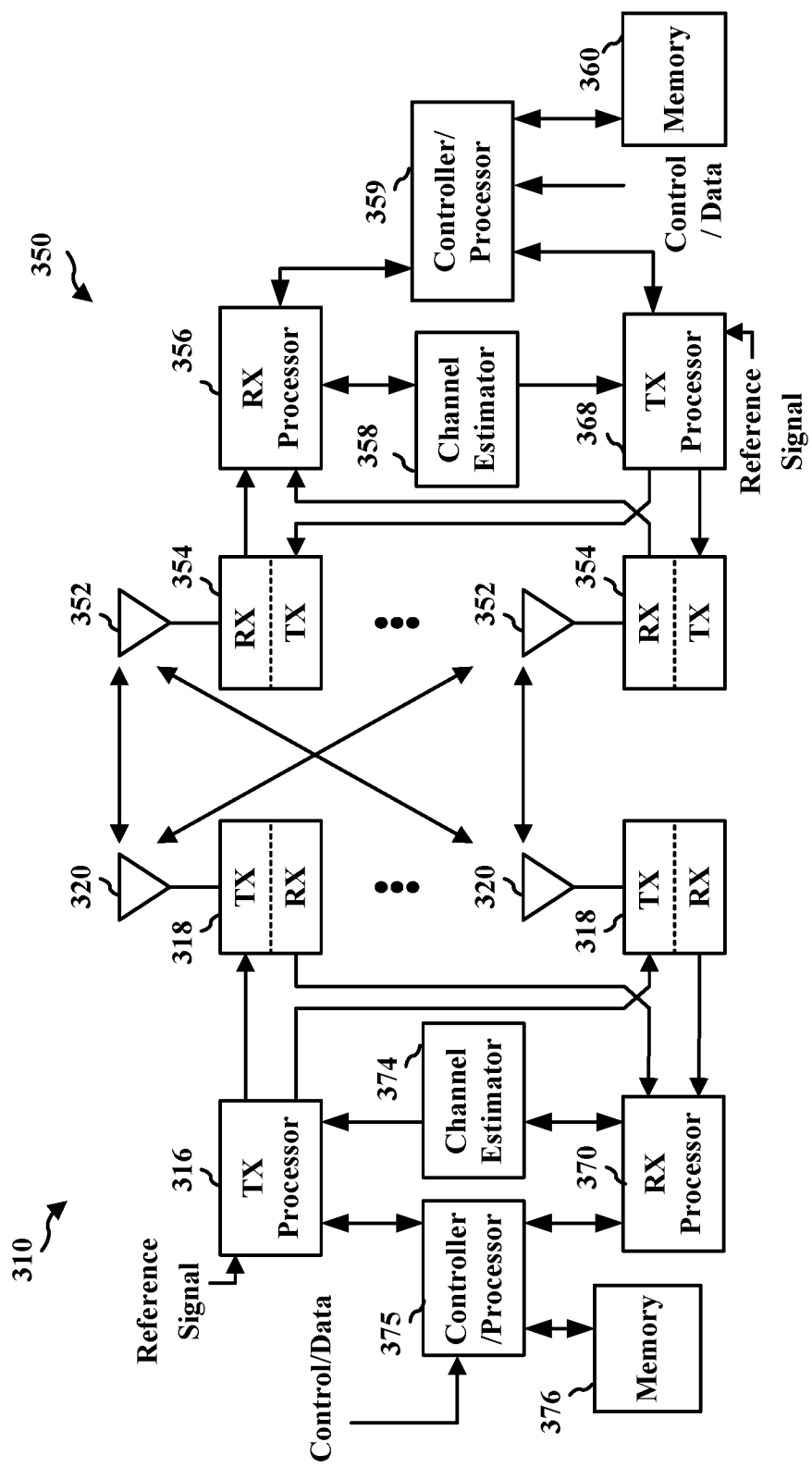
FIG. 3 is a diagram illustrating an example of an IAB node and user equipment (UE) in a network.

FIG. 3 is a block diagram of an IAB node 310 in communication with a UE 350 in an access network. In the DL, IP packets from the EPC 160 or core network 190 may be provided to a controller/processor 375. The controller/processor 375 implements layer 3 and/or layer 2 functionality. Layer 3 includes a radio resource control (RRC) layer, which functionality may be performed if the IAB node is a donor IAB node. Layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the IAB node 310. These soft decisions may be based on channel estimates computed by the channel estimator 358. The soft decisions are then decoded and deinterleaved to recover the data and control signals that were originally transmitted by the IAB node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the IAB node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the IAB node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the IAB node 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160 or core network 190, e.g., via a donor IAB node if the IAB node is not a donor IAB node. The controller/processor 375 is also responsible for error detection using an ACK and/or NACK protocol to support HARQ operations.

At least one of the TX processor 316, the RX processor 370, and the controller/processor 375 may be configured to perform aspects in connection with determination component 198 of FIG. 1.

At least one of the TX processor 316, the RX processor 370, and the controller/processor 375 may be configured to perform aspects in connection with reception component 199 of FIG. 1.

Figure 4:
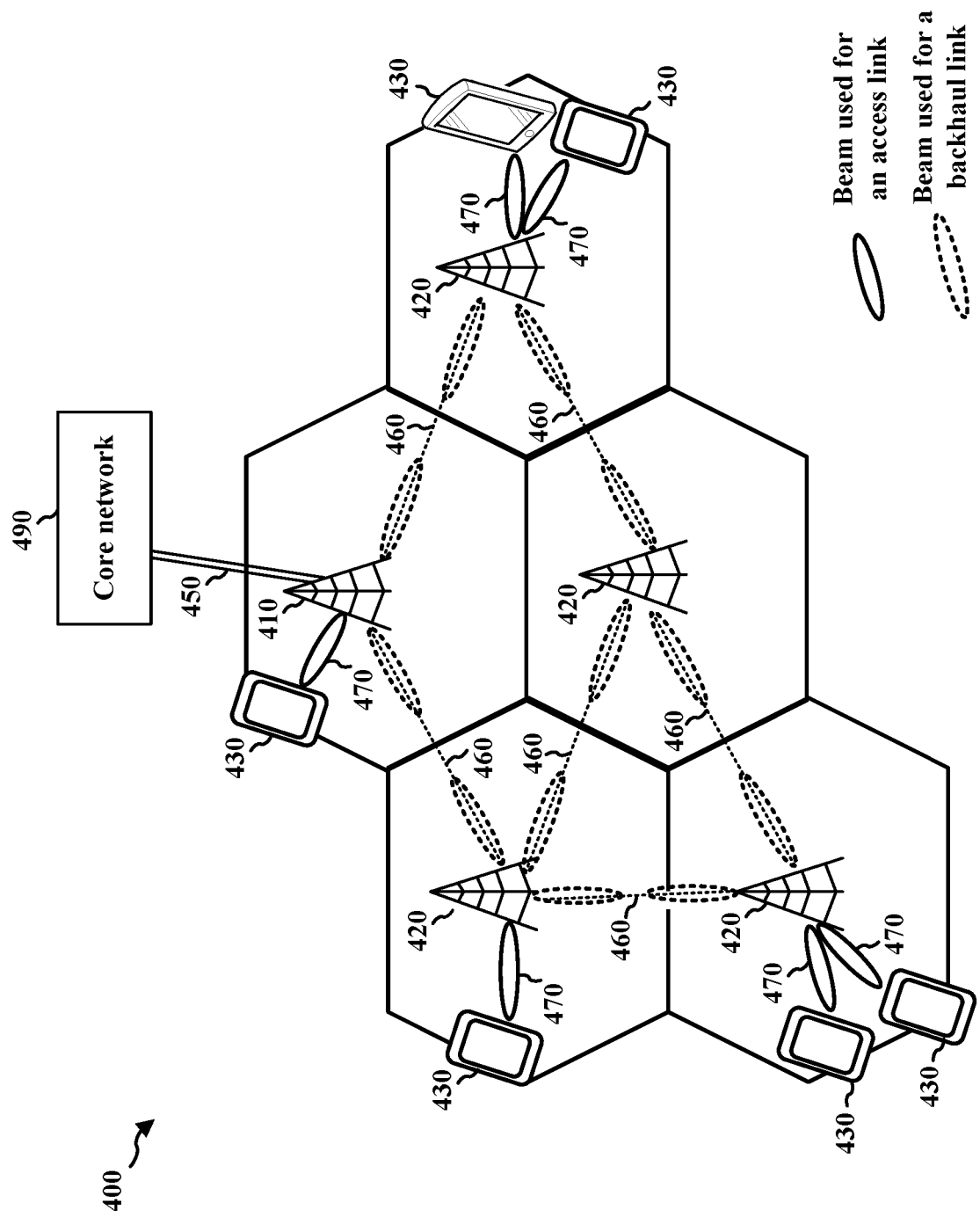
FIG. 4 is a diagram illustrating an example IAB network.

FIG. 4 is a diagram illustrating an IAB network 400. The IAB network 400 may include an anchor node (that may be referred to herein as an "IAB donor") 410 and access nodes (that may be referred to herein as "IAB nodes") 420. The IAB donor 410 may be a base station (e.g. base station 102/180 of FIG. 1), such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490 (e.g. core network 190 in FIG. 1). For example, resources may be shared between access links and backhaul links in the IAB network.

UEs 430 (e.g. UE 104 of FIG. 1) interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying uplink messages through their respective access link 470 to the IAB node 420, which then may relay the uplink message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the downlink message through the IAB network 400 via backhaul links 460 to the IAB node 420 connected to the UE 430, and the IAB node 420 sends the downlink message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For example, 5G NR systems may support PCI values. Accordingly, a given PCI value may be reused in the same network.

Figure 5:
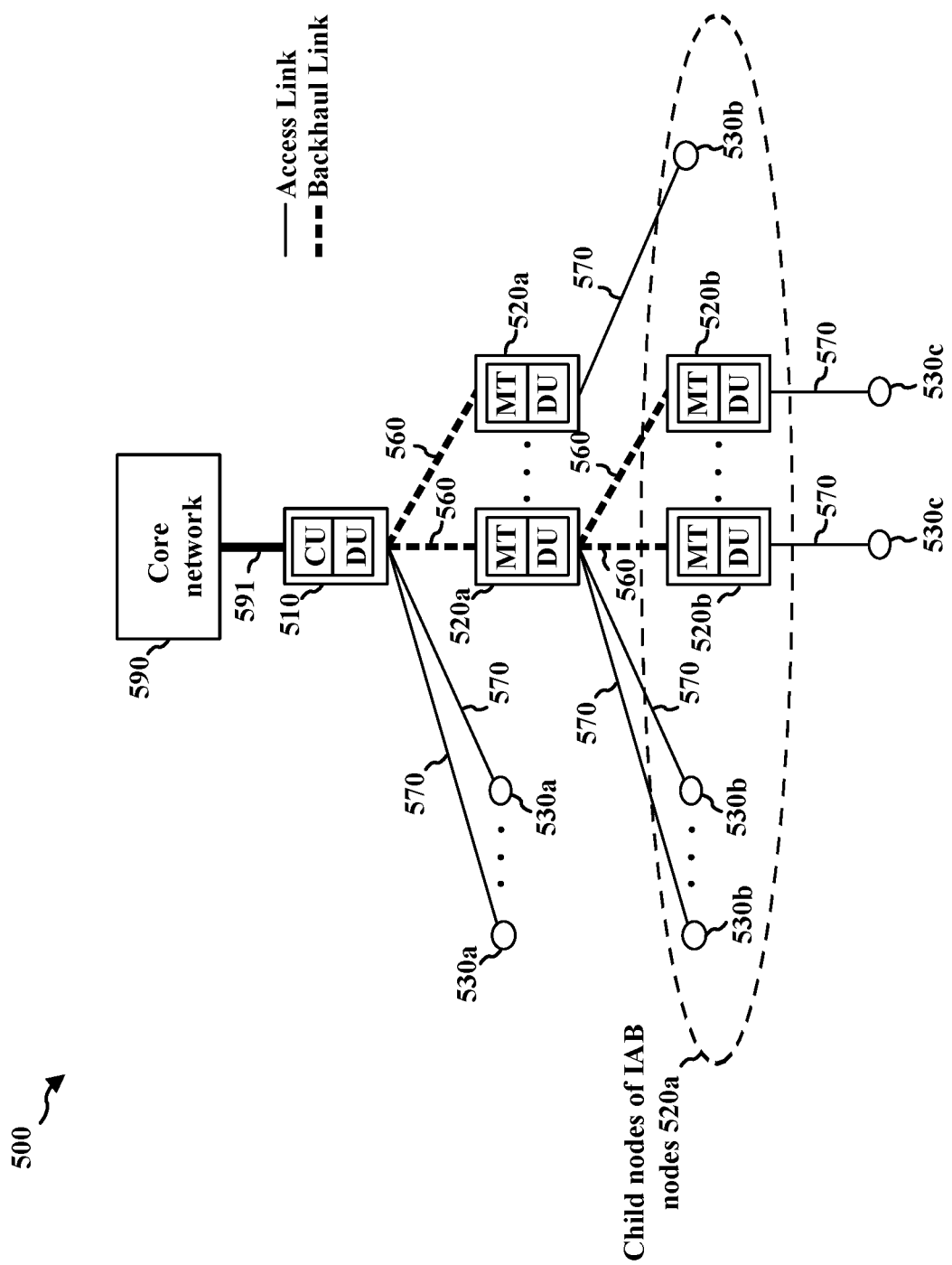
FIG. 5 is a diagram illustrating an example IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530. IAB network 500, IAB donor 510, IAB nodes 520, and UEs 530 may respectively correspond to IAB network 400, IAB donor 410, IAB nodes 420, and UEs 430 of FIG. 4.

The IAB donor 510 may be considered a root node of the tree structure of the IAB network 500. The IAB donor node 510 may be connected to the core network 590 (e.g. core network 190, 490) via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of IAB node 520a. The DU of IAB node 520a may schedule the child IAB nodes 520b and UEs 530b of the IAB node 520a. As an IAB node may provide a connection to an IAB node that in turn provides a connection for another IAB node, the pattern of a parent IAB node comprising a DU that schedules a child IAB node/child UE may continue.

Over-the-air (OTA) synchronization is a method for integrated access backhaul (IAB) nodes. In OTA synchronization, a given IAB node can derive an estimate of its downlink transmit timing from a downlink received signal from its parent node, as well as additional information provided by the parent node. In some aspects, the information provided may comprise two quantities: timing advance (TA) and T_delta. TA can refer to a mechanism used to align the reception of uplink signals from different UEs at the base station. This can be reused in IAB nodes to derive an estimate of the one-way propagation delay between a node and its parent node. T_delta can also refer to an additional term provided to a node by its parent node, which represents an additional correction factor to compensate for transmission and/or reception timing misalignment at the parent node. In turn, this can result in TA not being an accurate estimate of the round trip delay between the two nodes. In some aspects of IAB, each IAB node can be expected to be time aligned from a downlink signal transmission point of view. Nodes can also be referred to as wireless devices.

In some aspects, IAB can support an OTA synchronization mechanism to synchronize all the IAB nodes in a distributed manner. For instance, there can be a network of IAB nodes, i.e., a wireless backhaul network, and this network can be synchronized. In OTA synchronization, the signals can be transmitted by the nodes over the air, and hence may provide additional or alternate synchronization sources than external synchronization sources such as GPS or Ethernet that may not always be available. IAB nodes can also be connected to multiple parent nodes using an OTA technique, e.g., OTA signals. This network can be synchronized using the OTA technique. By doing so, external synchronization sources, e.g., GPS, may not be needed.

In OTA synchronization, each IAB node MT can synchronize to its parent node(s), following the synchronization procedure for UEs. MTs can operate in a similar manner to a UE for communication with a parent node, including receiving control communication from the parent node. The IAB node can also operate in a similar manner to a base station in communication with its children nodes, e.g., UEs or other IAB nodes. In some aspects, an IAB node DU can provide a synchronization source, such as by following a similar procedure to an access network, e.g., by transmitting synchronization signals, estimating uplink synchronization, and/or providing a timing advance command to compensate for propagation delay. The DU can provide signaling, e.g., T_delta, to enable more accurate estimation of the round-trip time (RTT) at the child node.

Once the IAB node is synchronized with the parent node, this same synchronization can be used by the DU of the IAB node to provide a reference for the child nodes of the IAB node. The DU can transmit signals, and receive signals from a child node, in order to optimize the synchronization. Accordingly, the IAB node can synchronize with its parent node, and then use the same synchronization technique to synchronize with its child nodes or other cells. Additionally, if an IAB node is connected to multiple synchronization sources, it can receive multiple estimations or measurements for timing and combine them to achieve a better synchronization.

In some instances, OTA synchronization may suffer from accumulated error across multiple hops, i.e., the number of intermediate devices through which data or communication may pass between the source and the destination. Hence, the maximum tolerable error over each hop along with the synchronization accuracy specifications may dictate the maximum number of hops that can support OTA synchronization. So the maximum tolerable error can be added over multiple hops until an error threshold is reached. In any case, multi-hop OTA synchronization, e.g., up to five or six hops, can still meet timing synchronization accuracy specifications. These specifications can be certain time periods, e.g., 3 μs, among any two cells with overlapping coverage.

In addition to timing synchronization, OTA synchronization can also provide for frequency synchronization. In some aspects, the nodes may synchronize both timing, e.g., the timing reference used for their communications, and frequency. In some instances, an inaccurate frequency can lead to performance degradation, e.g., when there is a non-negligible relative frequency offset between two communicating nodes. For example, a frequency offset may exist between a base station and a UE or between an IAB node and its parent. This can affect the signal-to-noise ratio (SNR) in the network. A large absolute frequency error may also lead to a transmission that can leak to an adjacent channel, and hence degrade the performance of other nodes operating in the adjacent channel. For example, even if a UE and a base station can include a similar relative frequency, if their frequency is offset in the absolute sense, then this can result in transmission leakage.

Some aspects of the present disclosure can include frequency synchronization thresholds for wireless devices such as IAB nodes. The thresholds may be similar to frequency synchronization thresholds for base stations or UEs. For example, a local base station may include an accuracy indication, or frequency error minimum requirement, of ±0.1 parts-per-million (ppm). A medium range base station may also include an accuracy indication of ±0.1 ppm. And a wide range base station may include an accuracy indication of ±0.05 ppm. The frequency error can be the measure of the difference between the actual BS transmit frequency and the assigned frequency, and may be in terms of ppm. Further, a UE modulated carrier frequency can be accurate to within 0.1 ppm observed over a period of 1 ms compared to the carrier frequency received from the base station.

IAB MTs and DUs can also include frequency synchronization specifications. For instance, the specification for an IAB MT can be similar to a UE, i.e., a relative accuracy of within 0.1 ppm with respect to its parent node. Also, the specification for an IAB DU can be similar to a base station, i.e., an absolute accuracy of 0.1 ppm.

In some aspects, the OTA synchronization procedure may not be able to be relied upon for frequency synchronization. Hence, IAB nodes may rely on other, external synchronization sources, e.g., GPS. This may limit the IAB deployment flexibility and may limit indoor deployment. This may also increase the cost of IAB deployment. The present disclosure provides aspects that enable an IAB node to synchronize its frequency using, at least in part, OTA signaling from the parent node.

The frequency synchronization may be with respect to an absolute frequency, e.g., an assigned frequency, rather than a relative frequency that is received from a parent node. In some instances, an IAB node can achieve an improved level of frequency synchronization accuracy, e.g., less than 0.1 ppm, by enhancing its receiver algorithms, using better components, and/or doing more measurements. As such, aspects of the present disclosure can support a tighter relative frequency synchronization specification, in addition to an absolute specification, and support a multi-hop OTA frequency synchronization.

Even if an IAB node synchronizes its frequency to the frequency of its parent node to a small residual error, e.g., 0.01 ppm, the IAB node may still not meet the absolute frequency specifications, as the IAB node may be unaware of the parent node's frequency with respect to the absolute reference. Aspects of the present disclosure enable an IAB node to address the potential for parent nodes to have different levels of frequency synchronization accuracy when performing an OTA synchronization procedure for frequency synchronization.

Aspects of the present disclosure can support the communication of frequency synchronization accuracy between IAB nodes. In some aspects, the present disclosure can support a broadcasting or signaling that indicates the level of frequency synchronization accuracy of an IAB node. For instance, if an IAB node includes a frequency accuracy within the absolute frequency specifications, this can be broadcasted or advertised. In some aspects, this broadcasting can be to another node within the network, e.g., a parent or child, or a node outside the network.

In some aspects, an IAB node can measure or estimate its frequency synchronization accuracy based on a number of different factors, such as the frequency synchronization accuracy of its synchronization sources. Also, an IAB node can measure or estimate its frequency synchronization accuracy based on its own capability, e.g., the IAB node has a disciplined crystal oscillator. An IAB node can also measure or estimate its frequency synchronization accuracy based on the quality of the links to the synchronization sources, e.g., the link to a parent node. Further, an IAB node can measure or estimate its frequency synchronization accuracy based on a number of measurements, i.e., related to how long it has been measuring and improving its frequency estimation. Also, an IAB node can measure or estimate its frequency synchronization accuracy based on the mobility state of the IAB node.

In some instances, an IAB node can estimate the absolute frequency by combining all the measurements from other synchronization sources, as well as its own frequency. In some aspects, the combination of these measurements can be determined at least in part based on the advertised accuracy level that is broadcasted by the synchronization sources. For instance, higher accuracy levels may be given more weight than lower accuracy levels when combining all the measurements together.

Aspects of the present disclosure can include one IAB node that determines its frequency synchronization accuracy and/or communicates or broadcasts its frequency synchronization accuracy. Another node can receive this broadcasted frequency synchronization accuracy and/or determine its own frequency synchronization accuracy, as well as broadcast this frequency synchronization accuracy.

As indicated above, an IAB node can indicate its frequency synchronization accuracy by signaling. This signaling can be local, e.g., sent directly by the IAB node over the air. This signaling can also be sent by the DU over downlink transmission in a SIB, a dedicated RRC, a MAC, or DCI. In some aspects, this transmission can be to a child node. Additionally, this signaling can be sent by the MT over uplink communication in a MAC-CE or UCI, e.g., to a parent node.

Frequency synchronization accuracy by signaling from an IAB node can also be centralized, e.g., an IAB node may send an indication to a central entity such as a central unit (CU), and receives the quality of other synchronization sources from the central entity. As such, the protocol can be implemented by a DU or a CU. There can also be an interface between the DU and the CU. In some aspects, both the local and centralized signaling can be simultaneously supported. This signaling can also be dynamic or semi-static, as well as sent periodically.

In some aspects, the content of the signaling can include the level of absolute frequency synchronization accuracy. For example, the signaling can include the ppm value. A few quantized ppm values can be configured in the specification, and an index is indicated, e.g., 0.025, 0.05, 0.075, or 0.1 ppm. The content of the signaling can also include whether the IAB node has an external synchronization source, e.g., a GPS, or the number of hops to a node with GPS connection. In some aspects, this synchronization source with a GPS can be among the children of the IAB node. Additionally, the content of the signaling can include whether an IAB node can be used as a frequency synchronization source. Further, the content of the signaling can include a capability, feature, or class indication, e.g., whether this node is able to synchronize to a reference within a certain ppm relative accuracy.

Figure 6:
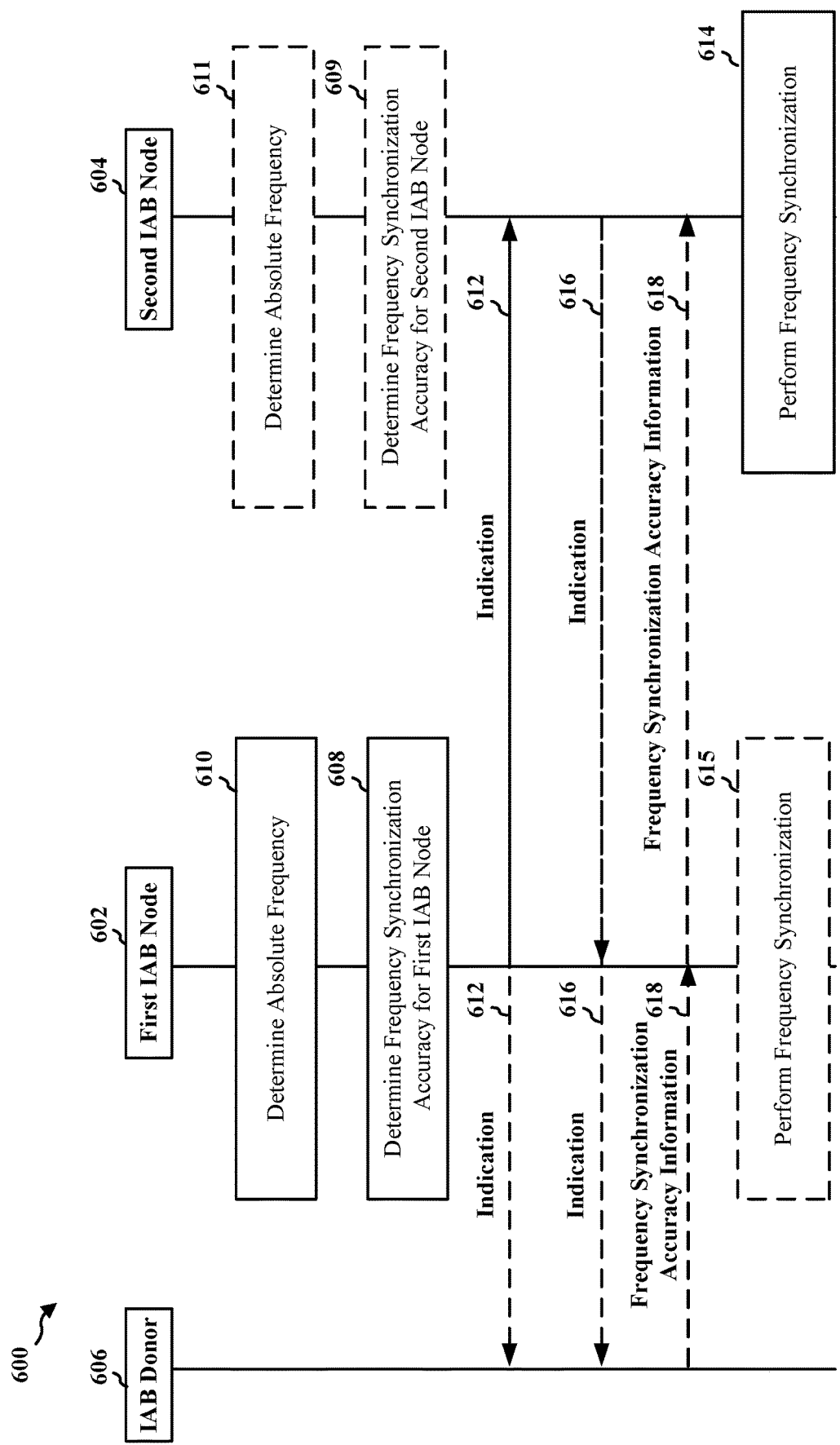
FIG. 6 is a diagram illustrating an example call flow between IAB nodes.

FIG. 6 is a call flow diagram 600 illustrating an example of communication between a first IAB node 602 and a second IAB node 604 in an IAB network. The IAB nodes 602, 604 may also communicate with an IAB donor 606 in the IAB network. Referring to FIG. 5, in one example, first IAB node 602 may correspond to IAB node 520a and second IAB node 604 may correspond to IAB node 520b. Thus, first IAB node may be a parent of second IAB node in one example. In another example, first IAB node 602 may correspond to IAB node 520b and second IAB node may correspond to IAB node 520a. Thus, first IAB node may be a child of second IAB node in one example. IAB donor 606 may correspond to IAB donor 510.

At 608, first IAB node 602 determines a frequency synchronization accuracy for the first IAB node. For example, referring to FIG. 5, the IAB node 520a may measure or estimate its frequency synchronization accuracy based on a number of different factors, such as the frequency synchronization accuracy of its synchronization sources (e.g. its parent and/or child IAB nodes, IAB donor 510, or UEs 530), its own capability (e.g., if the IAB node 520a has a disciplined crystal oscillator), the quality of the links to the synchronization sources (e.g., the link to a parent node), a number of measurements (e.g. related to how long the IAB node 520a has been measuring and improving its frequency estimation), or the mobility state of the IAB node 520a.

At 610, first IAB node 602 determines an absolute frequency based on a combination of measurements from at least one synchronization source and a frequency of the first IAB node. The frequency synchronization accuracy determined at 608 can be based on the absolute frequency. For example, referring to FIG. 5, IAB node 520a can estimate the absolute frequency by combining all the measurements from other synchronization sources, as well as its own frequency. In some aspects, the combination weights of these measurements can be determined at least in part based on an advertised accuracy level that is broadcasted by the synchronization sources. For instance, higher accuracy levels may be given more weight than lower accuracy levels when combining all the measurements together.

After determining the frequency synchronization accuracy, first IAB node 602 transmits an indication 612 of the determined frequency synchronization accuracy for the first IAB node. For example, referring to FIG. 5, the level of frequency synchronization accuracy of the IAB node 520a may be broadcast or signaled to other IAB nodes 520b within the IAB network (e.g. a parent or child, or a node outside the network) when the frequency accuracy is determined to be within absolute frequency specifications. The content of the indication 612 can include the level of absolute frequency synchronization accuracy. For example, the indication can include an index indicating the ppm value (determined at 608) out of a few configured quantized ppm values, e.g., 0.025, 0.05, 0.075, or 0.1 ppm. The content of the indication can also include whether the IAB node 520a has an external synchronization source, e.g., a GPS, or the number of hops to another node with GPS connection. In some aspects, this synchronization source with a GPS can be among the children of the IAB node 520a. Additionally, the content of the indication can include whether the IAB node 520a can be used as a frequency synchronization source. Further, the content of the indication can include a capability, feature, or class indication, e.g., whether this IAB node 520a is able to synchronize to a reference within a certain ppm relative accuracy.

The first IAB node 602 can indicate its frequency synchronization accuracy by local signaling, e.g., sent directly by the first IAB node over the air. For example, referring to FIG. 5, this signaling can be sent by the DU of the IAB node 520a to a child node over a downlink transmission in a SIB, a dedicated RRC, a MAC, or DCI, or this signaling can be sent by the MT of the IAB node 520a to a parent node over uplink communication in a MAC-CE or UCI. When frequency synchronization accuracy is centralized, the first IAB node 602 may also send an indication to the IAB donor 606 (e.g. a CU of IAB donor 510), and receive the quality of other synchronization sources from the IAB donor. Both the local and centralized signaling can be simultaneously supported. This indication can be signaled dynamically in response to determining at 608 a change in frequency synchronization accuracy of the first IAB node 602 from a previously indicated frequency synchronization accuracy. Alternatively, the indication can be signaled semi-statically or periodically.

Subsequently, the second IAB node 604 receives the indication 612 of the frequency synchronization accuracy for the first IAB node 602. In one example referring to FIG. 5, when the second IAB node is a child (e.g. IAB node 520b) to the first IAB node (e.g. IAB node 520a), the second IAB node may receive the indication in a downlink transmission as local signaling from the first IAB node in a SIB, a dedicated RRC, a MAC, or DCI. In another example, when the second IAB node is a parent (e.g. IAB node 520a) to the first IAB node (e.g. IAB node 520b), the second IAB node may receive the indication in an uplink transmission as local signaling from the first IAB node in a MAC-CE or UCI. When frequency synchronization accuracy is centralized, the second IAB node 604 may also receive the indication from the IAB donor 606 (e.g. the CU of IAB donor 510). The indication can be received from the first IAB node or IAB donor dynamically (e.g. in response to a change in frequency synchronization accuracy of the first IAB node 602), or semi-statically or periodically.

Afterwards, at 614, the second IAB node 604 uses the indication 612 and performs a frequency synchronization based on a frequency of the first IAB node 602. For example, referring to FIG. 5, IAB node 520b can estimate the absolute frequency by combining all the measurements from other synchronization sources including IAB node 520a. In some aspects, the combination weights of these measurements can be determined at least in part based on an advertised accuracy level that is broadcasted by the synchronization sources. For instance, higher accuracy levels may be given more weight than lower accuracy levels when combining all the measurements together.

While the above-described example of FIG. 6 refers to the first IAB node as determining frequency synchronization accuracy and sending the indication to the second IAB node to use to perform frequency synchronization, the roles may be reversed. For example, at 609, the second IAB node 604 may also determine a frequency synchronization accuracy (e.g. based on a determined absolute frequency at 611), and the second IAB node 604 may transmit an indication 616 of its own frequency synchronization accuracy. For example, the second IAB node 604 may perform similar operations to 608 and 610 as the first IAB node 602, and the second IAB node may transmit its own indication of frequency synchronization accuracy to the first IAB node, to the IAB donor 606, or to other IAB nodes. The content of the indication 616 may be similar to the content of indication 612. Similarly, the first IAB node 602 may receive the indication 616 of frequency synchronization accuracy from the second IAB node, from the IAB donor 606, or from other IAB nodes, and at 615, the first IAB node may perform a frequency synchronization based on a frequency of the other IAB node(s) (similar to the operation at 614).

In the case where frequency synchronization accuracy is centralized, then at 618, the IAB donor 606 can receive indications 612, 616 from the first IAB node 602 and the second IAB node 604 of a frequency synchronization accuracy from the respective IAB nodes. The indication(s) 612, 616 can be received from the IAB node(s) dynamically (e.g. in response to a respective change in frequency synchronization accuracy of the first or second IAB node), or semi-statically or periodically. Subsequently, the IAB donor 606 may send frequency synchronization accuracy information 618 for the first IAB node and second IAB node. For example, referring to FIG. 5, IAB donor 510 may send frequency synchronization accuracy information 618 for IAB node 520a and IAB node 520b respectively to the corresponding IAB nodes. The IAB nodes may then perform frequency synchronization (e.g. at 614, 615) based on the frequency synchronization accuracy information.

Figure 7:
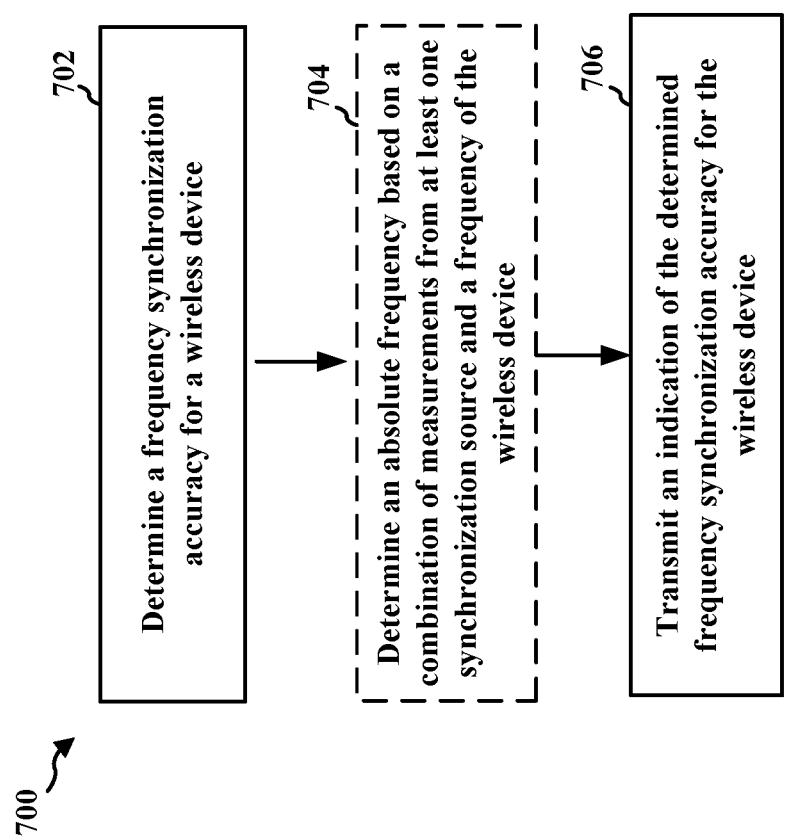
FIG. 7 is a flowchart of a method of wireless communication.

FIG. 7 is a flowchart 700 of a method of wireless communication. The method may be performed by a wireless device such as an IAB node, or a component of the wireless device (e.g., the IAB node 103, 310, 410, 420, 520, 850; the apparatus 802/802'; the processing system 914, which may include the memory 376 and which may be the entire IAB node 310 or a component of the IAB node 310, such as the TX processor 316, the RX processor 370, and/or the controller/processor 375). In one example, the method may be performed by first IAB node 602 of FIG. 6. In another example, the method may be performed by second IAB node 604 of FIG. 6. Optional aspects are illustrated with a dashed line. The methods described herein can provide a number of benefits, such as improving communication signaling, resource utilization, and/or power savings for IAB nodes.

At 702, the wireless device or IAB node can determine a frequency synchronization accuracy for the wireless device, as described in connection with the examples in FIGS. 4 and 5, and FIG. 6 (e.g. at 608, 609). For example, determination component 806 of apparatus 802 may determine a frequency synchronization accuracy for the wireless device.

At 704, the wireless device or IAB node can determine an absolute frequency based on a combination of measurements from at least one synchronization source and a frequency of the wireless device, where the frequency synchronization accuracy can be based on the absolute frequency, as described in connection with the examples in FIGS. 4 and 5, and FIG. 6 (e.g. at 610, 611). For example, determination component 806 of apparatus 802 may determine an absolute frequency based on a combination of measurements from at least one synchronization source and a frequency of the wireless device.

At 706, the wireless device or IAB node can transmit an indication of the determined frequency synchronization accuracy for the wireless device, as described in connection with the examples in FIGS. 4 and 5, and FIG. 6 (e.g. indication 612, 616). For example, transmission component 808 of apparatus 802 may transmit an indication of the determined frequency synchronization accuracy for the wireless device.

In some aspects, the frequency synchronization accuracy may be determined based on at least one of: a source synchronization accuracy for at least one synchronization source, a capability of the wireless device, a link quality to the at least one synchronization source, a number of measurements that the wireless device uses for a frequency synchronization, or a mobility state of the wireless device or the at least one synchronization source. Also, the wireless device may determine the absolute frequency based on the combination of measurements for multiple synchronization sources using a weight for each synchronization source based on a respective frequency synchronization accuracy level for each of the multiple synchronization sources.

Additionally, the wireless device may transmit the indication of the determined frequency synchronization accuracy for the wireless device in a downlink transmission comprising at least one of: system information; a radio resource control (RRC) message; a medium access control (MAC) message; or downlink control information (DCI). Further, the wireless device may transmit the indication of the determined frequency synchronization accuracy for the wireless device in an uplink transmission comprising at least one of: a medium access control-control element (MAC-CE); or uplink control information (UCI).

In some instances, the wireless device may transmit the indication of the determined frequency synchronization accuracy for the wireless device to a central entity (e.g. IAB donor 606). Also, the wireless device can transmit the indication of the determined frequency synchronization accuracy for the wireless device dynamically in response to a change in the frequency synchronization accuracy for the wireless device. The wireless device can also transmit the indication of the determined frequency synchronization accuracy for the wireless device periodically or in a semi-static pattern. Moreover, the indication of the determined frequency synchronization accuracy for the wireless device can comprise an index for a quantized accuracy value.

The indication of the determined frequency synchronization accuracy for the wireless device may comprise synchronization source information for the wireless device. In some aspects, the source information may indicate an external synchronization source or a number of hops to a node with a GPS connection. Also, the indication of the determined frequency synchronization accuracy may further indicate a capability for use as a frequency synchronization source. In some instances, the indication of the determined frequency synchronization accuracy for the wireless device may comprise a capability, a feature, or a class indication that indicates that the wireless device is synchronized to a reference frequency within an accuracy threshold. Also, the wireless device may be an integrated access and backhaul (IAB) node.

Figure 8:
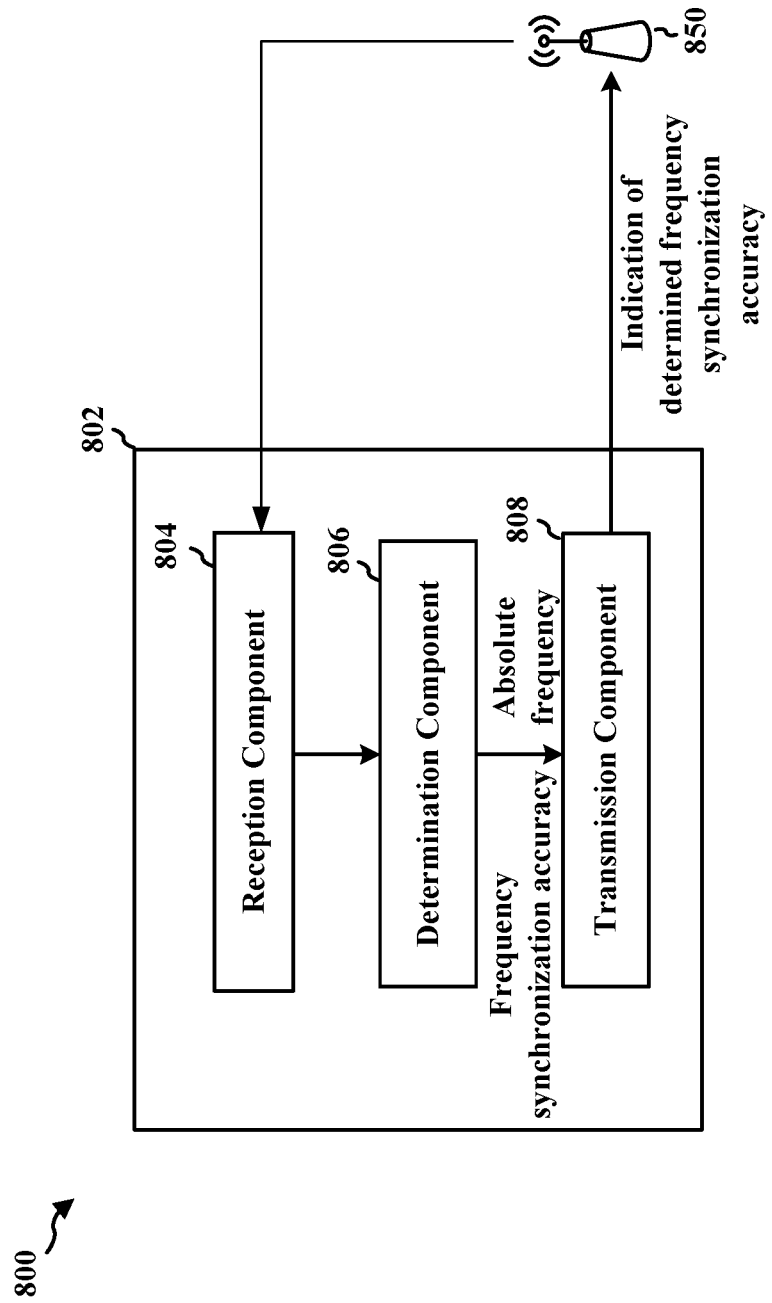
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a wireless device such as an IAB node in communication with another IAB node 850. For example, the apparatus may correspond to first IAB node 602 of FIG. 6, and the another IAB node 850 may correspond to second IAB node 604 of FIG. 6. Alternatively, the apparatus may correspond to second IAB node 604 of FIG. 6, and the another IAB node 850 may correspond to first IAB node 602 of FIG. 6. The apparatus includes a reception component 804 that is configured to receive communication, e.g., from IAB node 850. The apparatus also includes a determination component 806 that is configured to determine a frequency synchronization accuracy for the wireless device, e.g., as described in connection with step 702 above. Determination component 806 can also be configured to determine an absolute frequency based on a combination of measurements from at least one synchronization source and a frequency of the wireless device, e.g., as described in connection with step 704 above. The apparatus also includes a transmission component 808 that is configured to transmit an indication of the determined frequency synchronization accuracy for the wireless device, e.g., as described in connection with step 706 above.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
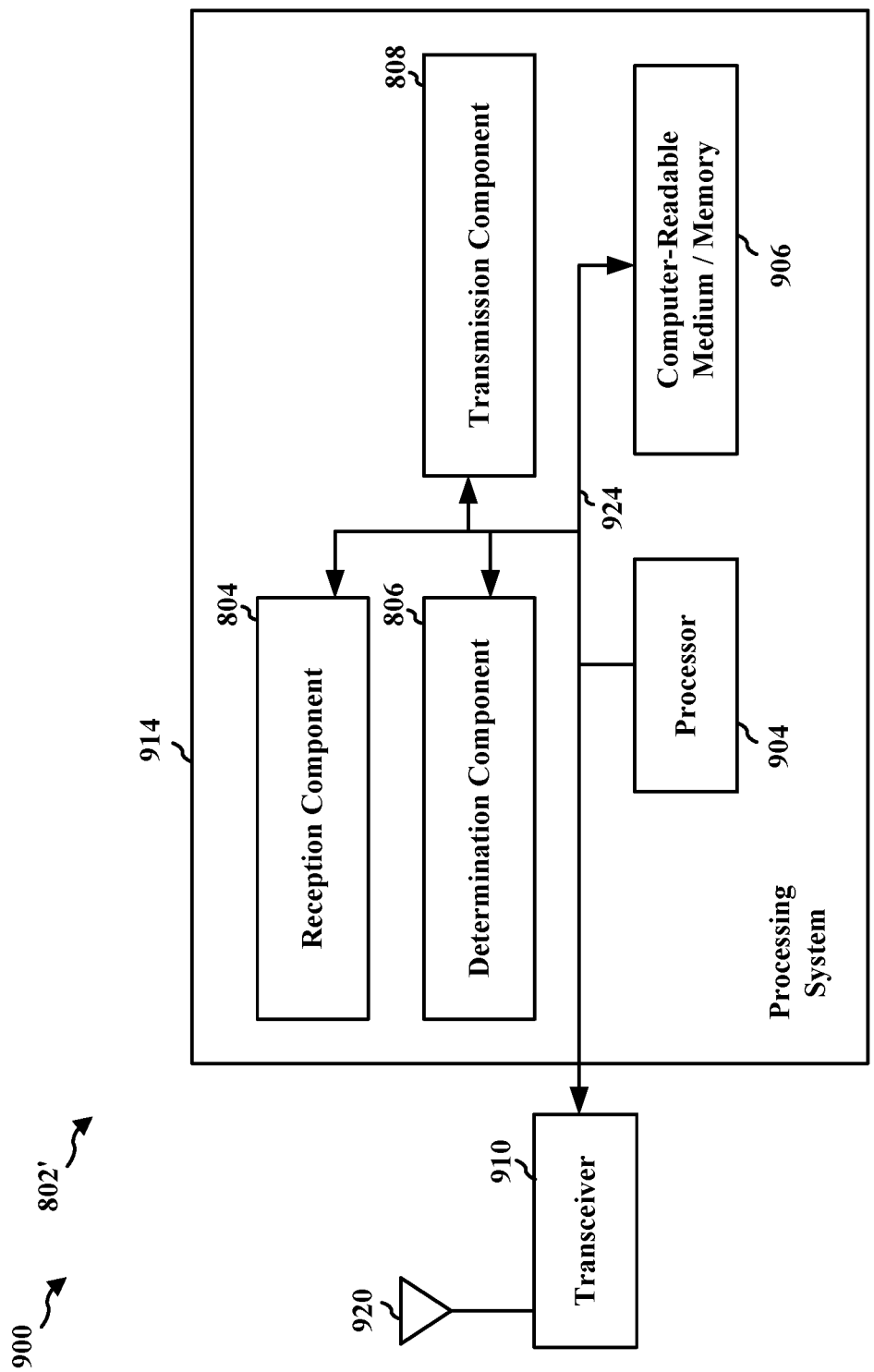
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 808, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808. The components may be software components running in the processor 904, resident/stored in the computer readable medium/memory 906, one or more hardware components coupled to the processor 904, or some combination thereof. The processing system 914 may be a component of the IAB node 310 and may include the memory 376 and/or at least one of the TX processor 316, the RX processor 370, and the controller/processor 375. Alternatively, the processing system 914 may be the entire IAB node (e.g., see 310 of FIG. 3).

In one configuration, the apparatus 802/802' for wireless communication includes means for determining a frequency synchronization accuracy for the wireless device. The apparatus also includes means for determining an absolute frequency based on a combination of measurements from at least one synchronization source and a frequency of the wireless device. The apparatus also includes means for transmitting an indication of the determined frequency synchronization accuracy for the wireless device. The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
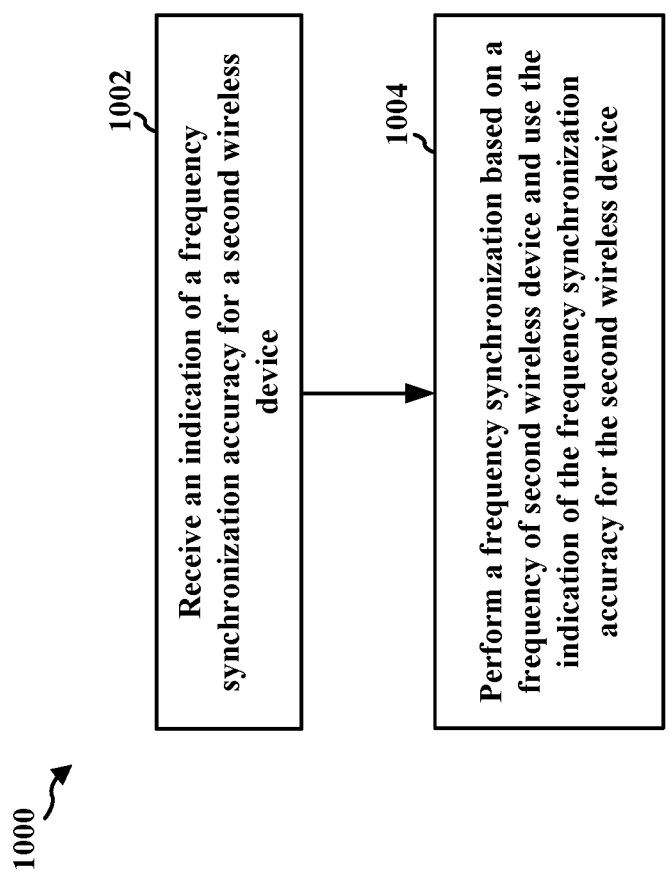
FIG. 10 is a flowchart of a method of wireless communication.

FIG. 10 is a flowchart 1000 of a method of wireless communication. The method may be performed by a first wireless device such as an IAB node, or a component of the first wireless device (e.g., the IAB node 103, 310, 410, 420, 520, 1150; the apparatus 1102/1102'; the processing system 1214, which may include the memory 376 and which may be the entire IAB node 310 or a component of the IAB node 310, such as the TX processor 316, the RX processor 370, and/or the controller/processor 375). In one example, the method may be performed by second IAB node 604 of FIG. 6. In another example, the method may be performed by first IAB node 602 of FIG. 6. Optional aspects are illustrated with a dashed line. The methods described herein can provide a number of benefits, such as improving communication signaling, resource utilization, and/or power savings for IAB nodes.

At 1002, the first wireless device can receive an indication of a frequency synchronization accuracy for a second wireless device, as described in connection with the examples in FIGS. 4 and 5, and FIG. 6 (e.g. indication 612, 616). For example, reception component 1104 of apparatus 1102 may receive an indication of a frequency synchronization accuracy for a second wireless device. For example, the first wireless device (e.g. IAB node 604) may receive indication 612 for a second wireless device (e.g. IAB node 602). Alternatively, the first wireless device (e.g. IAB node 602) may receive indication 616 for a second wireless device (e.g. IAB node 604).

At 1004, the first wireless device can perform a frequency synchronization based on a frequency of the second wireless device and use the indication of the frequency synchronization accuracy for the second wireless device, as described in connection with the examples in FIGS. 4 and 5, and FIG. 6 (e.g. at 614, 615). For example, performance component 1106 of apparatus 1102 may perform a frequency synchronization based on a frequency of the second wireless device and use the indication of the frequency synchronization accuracy for the second wireless device.

In some aspects, performing the frequency synchronization may include determining an absolute frequency (e.g. at 610, 611) based on a combination of measurements for multiple synchronization sources including the second wireless device, where the first wireless device can use a weight for each synchronization source based on a respective frequency synchronization accuracy level for each of the multiple synchronization sources.

Additionally, the first wireless device may receive the indication of the frequency synchronization accuracy for the second wireless device in a downlink transmission comprising at least one of: system information; a radio resource control (RRC) message; a medium access control (MAC) message; or downlink control information (DCI). Further, the first wireless device may receive the indication of the frequency synchronization accuracy for the second wireless device in an uplink transmission comprising at least one of: a medium access control-control element (MAC-CE); or uplink control information (UCI).

In some instances, the first wireless device may receive the indication of the frequency synchronization accuracy for the second wireless device from a central entity (e.g. IAB donor 606). Also, the first wireless device can receive the indication of the frequency synchronization accuracy for the second wireless device dynamically in response to a change in the frequency synchronization accuracy for the second wireless device. The first wireless device can also receive the indication of the frequency synchronization accuracy for the second wireless device periodically or in a semi-static pattern.

In some aspects, the indication of the frequency synchronization accuracy for the second wireless device may comprise an index for a quantized accuracy value. The indication of the frequency synchronization accuracy for the second wireless device may also comprise synchronization source information for the second wireless device. Additionally, the indication of the frequency synchronization accuracy can further indicate a capability for use as a frequency synchronization source. Further, the indication of the frequency synchronization accuracy for the second wireless device can comprise a capability, a feature, or a class indication that indicates that the second wireless device is synchronized to a reference frequency within an accuracy threshold.

In some aspects, the frequency synchronization accuracy is based on at least one of: a source synchronization accuracy for at least one synchronization source, a capability of the second wireless device, a link quality to the at least one synchronization source, a number of measurements that the second wireless device uses for the frequency synchronization, or a mobility state of the second wireless device. Also, the first wireless device can be a first integrated access and backhaul (IAB) node and the second wireless device is a second IAB node.

Figure 11:
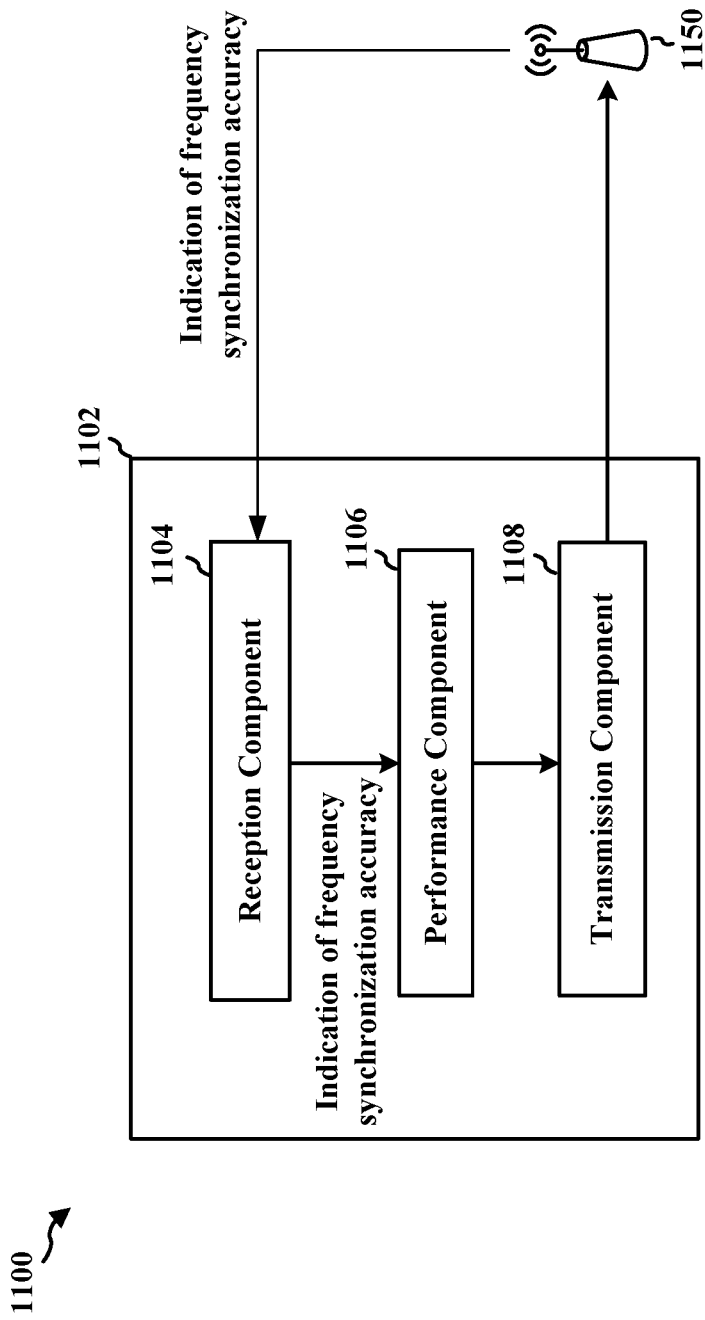
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a wireless device such as an IAB node in communication with another IAB node 1150. For example, the apparatus may correspond to second IAB node 604 of FIG. 6, and the another IAB node 1150 may correspond to first IAB node 602 of FIG. 6. Alternatively, the apparatus may correspond to first IAB node 602 of FIG. 6, and the another IAB node 1150 may correspond to second IAB node 604 of FIG. 6. The apparatus includes a reception component 1104 that is configured to receive an indication of a frequency synchronization accuracy for a second wireless device, e.g., as described in connection with step 1002 above. The apparatus also includes a performance component 1106 that is configured to perform a frequency synchronization based on a frequency of second wireless device and use the indication of the frequency synchronization accuracy for the second wireless device, e.g., as described in connection with step 1004 above. The apparatus also includes a transmission component 1108 that is configured to transmit communication, e.g., to IAB node 1150.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
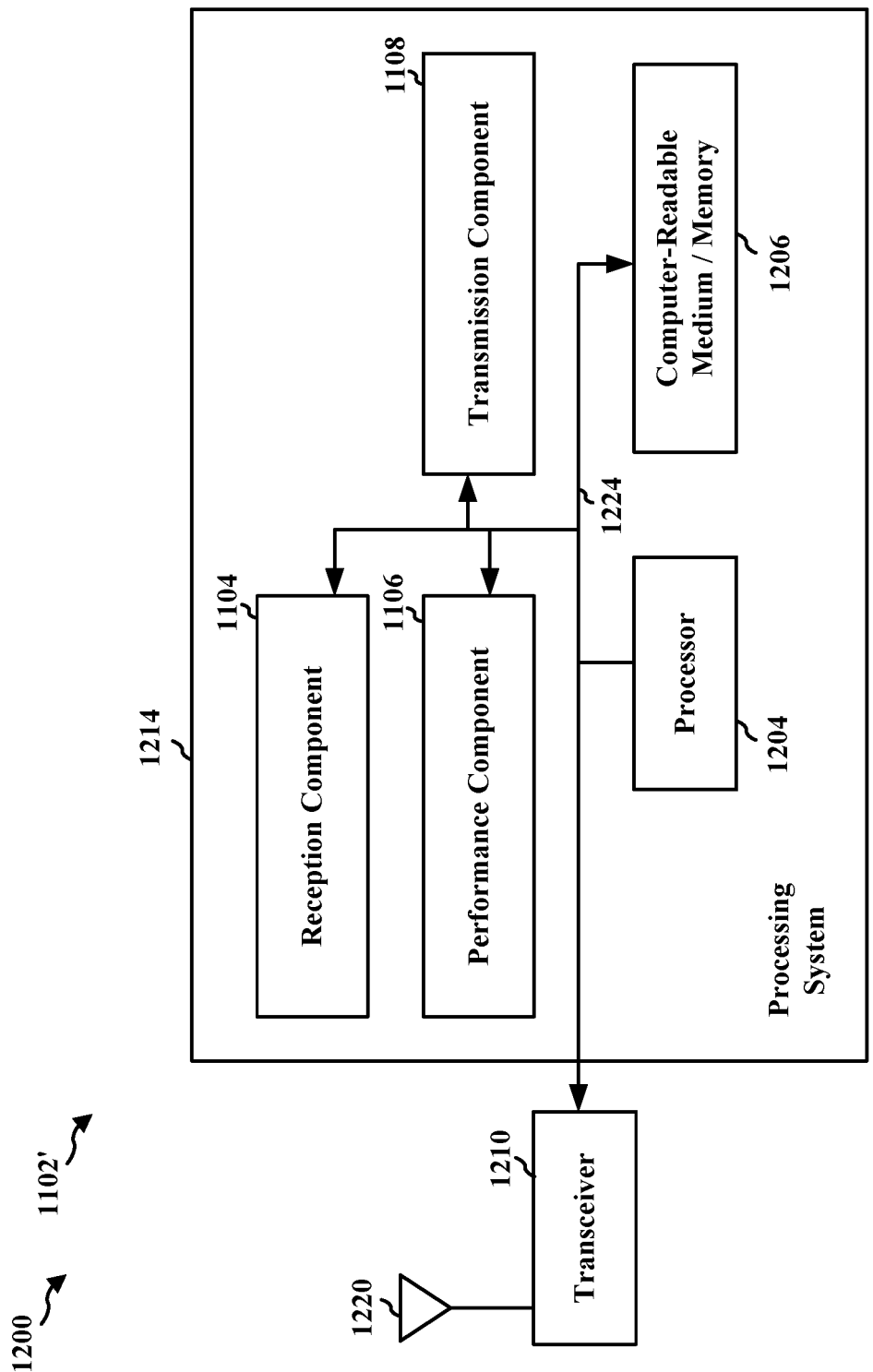
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof. The processing system 1214 may be a component of the IAB node 310 and may include the memory 376 and/or at least one of the TX processor 316, the RX processor 370, and the controller/processor 375. Alternatively, the processing system 1214 may be the entire IAB node (e.g., see 310 of FIG. 3).

In one configuration, the apparatus 1102/1102' for wireless communication can include means for receiving an indication of a frequency synchronization accuracy for a second wireless device. The apparatus can also include means for performing a frequency synchronization based on a frequency of the second wireless device and using the indication of the frequency synchronization accuracy for the second wireless device. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
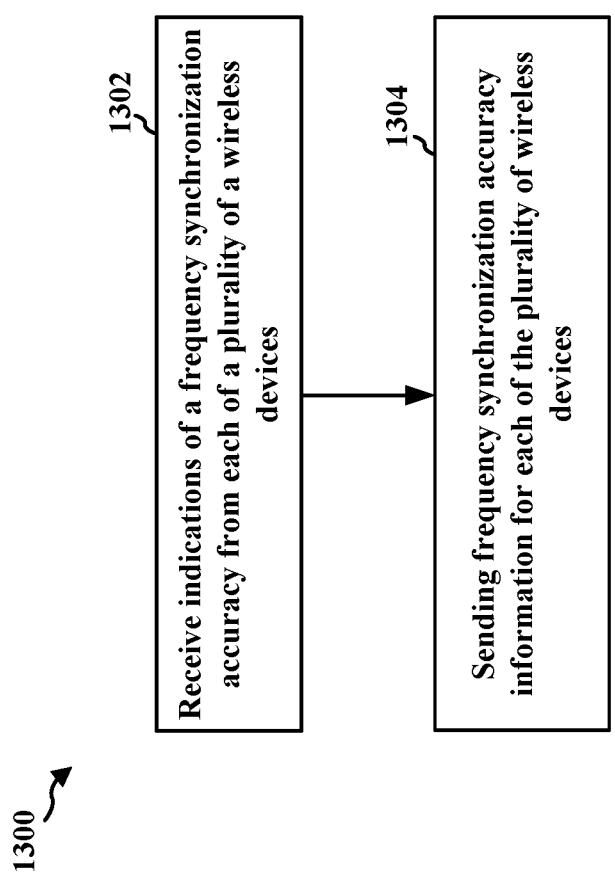
FIG. 13 is a flowchart of a method of wireless communication.

FIG. 13 is a flowchart 1300 of a method of wireless communication. The method may be performed by a wireless device such as a central entity in a wireless device network, or a component of the wireless device in the wireless device network (e.g., the wireless device 103, 310, 410, 510, 606; the apparatus 1402/1402'; the processing system 1514, which may include the memory 376 and which may be the entire wireless device 310 or a component of the wireless device 310, such as the TX processor 316, the RX processor 370, and/or the controller/processor 375). For example, the method may be performed by IAB donor 606 of FIG. 6. Optional aspects are illustrated with a dashed line. The methods described herein can provide a number of benefits, such as improving communication signaling, resource utilization, and/or power savings for IAB nodes.

At 1302, the wireless device or central entity can receive an indication of a frequency synchronization accuracy from each of a plurality of wireless devices, as described in connection with the examples in FIGS. 4 and 5, and FIG. 6 (e.g. indications 612, 616). For example, reception component 1404 of apparatus 1402 may receive indications of a frequency synchronization accuracy from each of a plurality of wireless devices. For instance, referring to FIG. 6, the IAB donor 606 may receive indications 612, 616 from the IAB nodes 602, 604, respectively.

At 1304, the wireless device or central entity can send frequency synchronization accuracy information for each of the plurality of wireless devices, as described in connection with the examples in FIGS. 4 and 5, and FIG. 6 (e.g. frequency synchronization accuracy information 618). For example, transmission component 1406 of apparatus 1402 may send frequency synchronization accuracy information for each of the plurality of wireless devices.

In some aspects, the wireless device or central entity can receive the indication of the frequency synchronization accuracy dynamically in response to a change in the frequency synchronization accuracy. The wireless device or central entity can also receive the indication of the frequency synchronization accuracy periodically or in a semi-static pattern. The indication of the frequency synchronization accuracy can comprise an index for a quantized accuracy value. Also, a respective indication of the frequency synchronization accuracy can comprise synchronization source information for a respective wireless device.

In some aspects, the indication of the frequency synchronization accuracy may further indicate a capability for use as a frequency synchronization source. Additionally, a respective indication of the frequency synchronization accuracy may comprise a capability, a feature, or a class indication that indicates that a respective wireless device is synchronized to a reference frequency within an accuracy threshold. Also, the wireless device network can be an integrated access and backhaul (IAB) network and the plurality of wireless devices are a plurality of IAB nodes.

Figure 14:
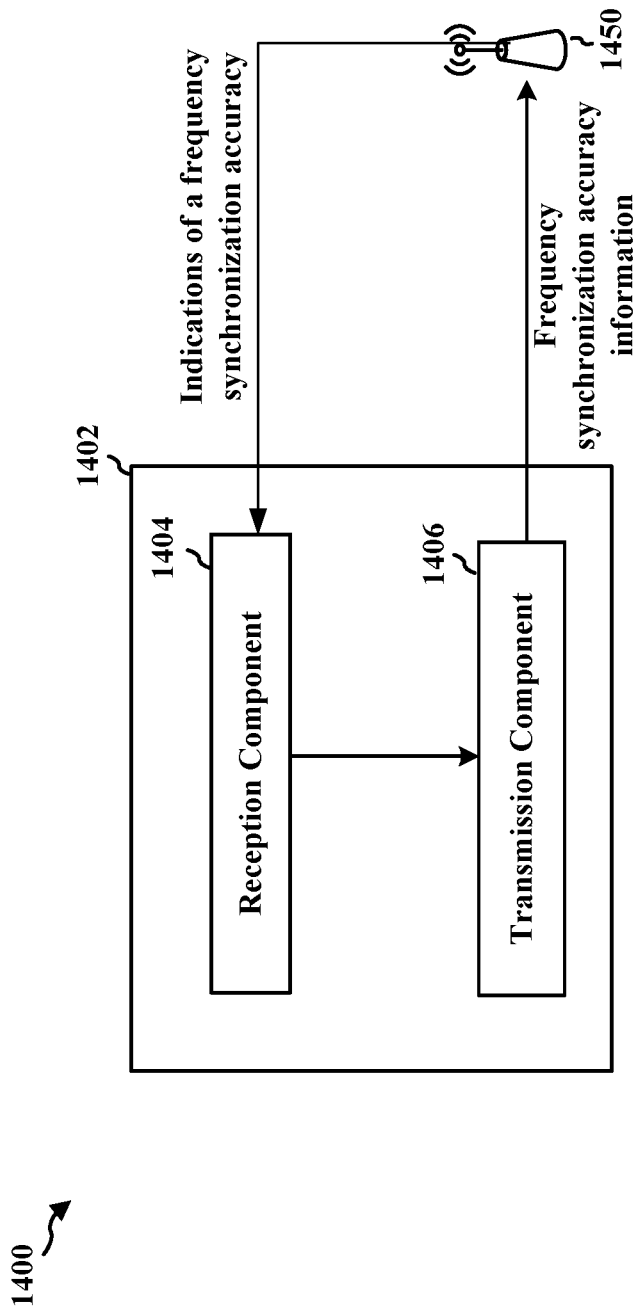
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a wireless device such as a central entity in communication with an IAB node 1450 in a wireless device network. For example, the apparatus may correspond to IAB donor 606 of FIG. 6. The apparatus can include a reception component 1404 that is configured to receive indications of a frequency synchronization accuracy from each of a plurality of wireless devices, e.g., as described in connection with step 1302 above. The apparatus can also include a transmission component 1406 that is configured to send frequency synchronization accuracy information for each of the plurality of wireless devices, e.g., as described in connection with step 1304 above.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
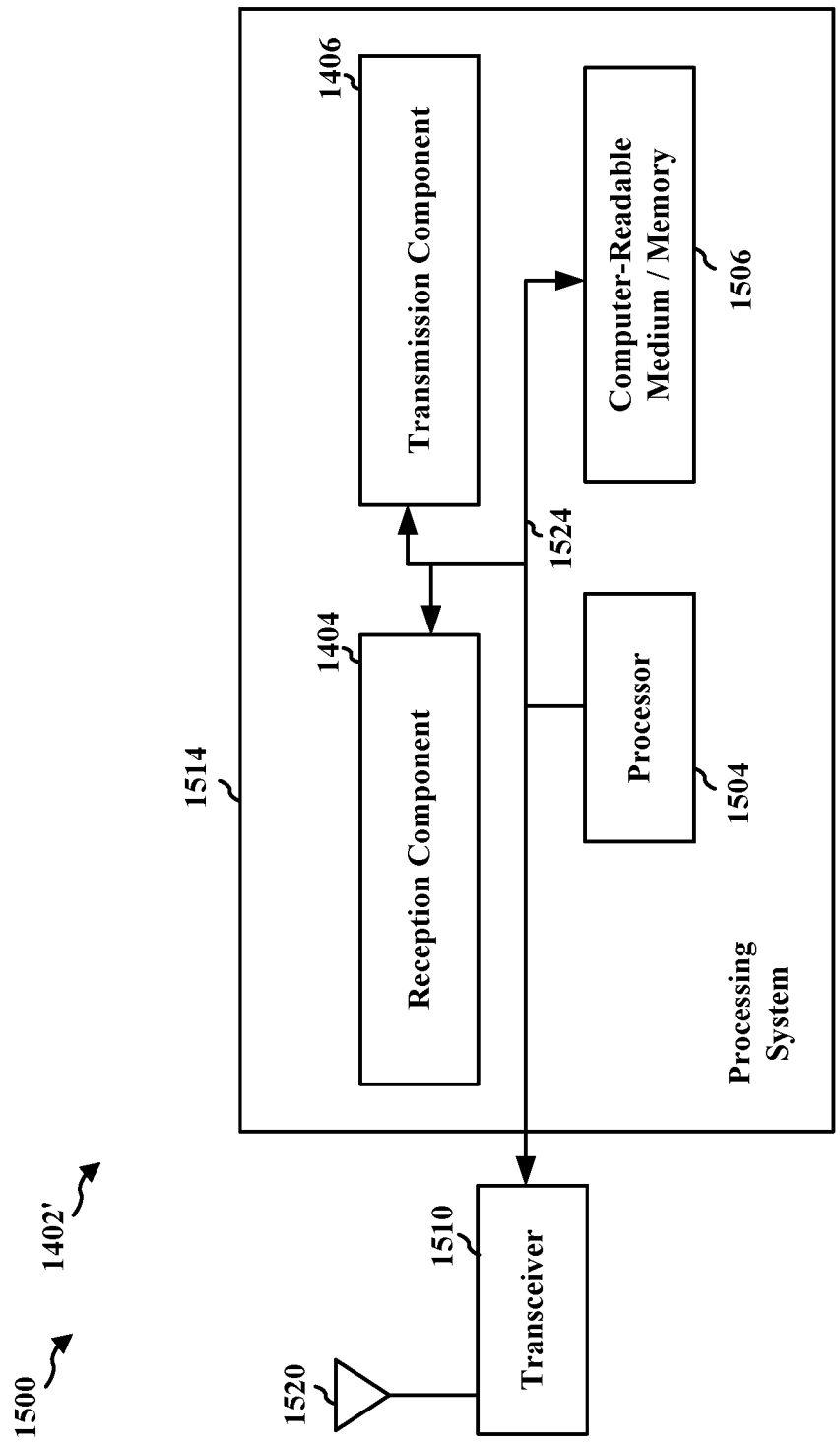
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404 and 1406, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404 and 1406. The components may be software components running in the processor 1504, resident/stored in the computer readable medium/memory 1506, one or more hardware components coupled to the processor 1504, or some combination thereof. The processing system 1514 may be a component of the IAB node 310 and may include the memory 376 and/or at least one of the TX processor 316, the RX processor 370, and the controller/processor 375. Alternatively, the processing system 1514 may be the entire IAB node (e.g., see 310 of FIG. 3).

In one configuration, the apparatus 1402/1402' for wireless communication includes means for receiving an indication of a frequency synchronization accuracy from each of a plurality of wireless devices. The apparatus can also include means for sending frequency synchronization accuracy information for each of the plurality of wireless devices. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a wireless device, comprising: determining a frequency synchronization accuracy for the wireless device; and transmitting an indication of the determined frequency synchronization accuracy for the wireless device.

Example 2 is the method of Example 1, wherein the frequency synchronization accuracy is determined based on at least one of: a source synchronization accuracy for at least one synchronization source, a capability of the wireless device, a link quality to the at least one synchronization source, a number of measurements that the wireless device uses for a frequency synchronization, or a mobility state of the wireless device or the at least one synchronization source.

Example 3 is the method of any of Examples 1 and 2, further comprising: determining an absolute frequency based on a combination of measurements from at least one synchronization source and a frequency of the wireless device, wherein the frequency synchronization accuracy is based on the absolute frequency.

Example 4 is the method of any of Examples 1 to 3, wherein the wireless device determines the absolute frequency based on the combination of measurements for multiple synchronization sources using a weight for each synchronization source based on a respective frequency synchronization accuracy level for each of the multiple synchronization sources.

Example 5 is the method of any of Examples 1 to 4, wherein the wireless device transmits the indication of the determined frequency synchronization accuracy for the wireless device in a downlink transmission comprising at least one of: system information; a radio resource control (RRC) message; a medium access control (MAC) message; or downlink control information (DCI).

Example 6 is the method of any of Examples 1 to 5, wherein the wireless device transmits the indication of the determined frequency synchronization accuracy for the wireless device in an uplink transmission comprising at least one of: a medium access control-control element (MAC-CE); or uplink control information (UCI).

Example 7 is the method of any of Examples 1 to 6, wherein the wireless device transmits the indication of the determined frequency synchronization accuracy for the wireless device to a central entity.

Example 8 is the method of any of Examples 1 to 7, wherein the wireless device transmits the indication of the determined frequency synchronization accuracy for the wireless device dynamically in response to a change in the frequency synchronization accuracy for the wireless device.

Example 9 is the method of any of Examples 1 to 8, wherein the wireless device transmits the indication of the determined frequency synchronization accuracy for the wireless device periodically or in a semi-static pattern.

Example 10 is the method of any of Examples 1 to 9, wherein the indication of the determined frequency synchronization accuracy for the wireless device comprises an index for a quantized accuracy value.

Example 11 is the method of any of Examples 1 to 10, wherein the indication of the determined frequency synchronization accuracy for the wireless device comprises synchronization source information for the wireless device.

Example 12 is the method of any of Examples 1 to 11, wherein the indication of the determined frequency synchronization accuracy further indicates a capability for use as a frequency synchronization source.

Example 13 is the method of any of Examples 1 to 12, wherein the indication of the determined frequency synchronization accuracy for the wireless device comprises a capability, a feature, or a class indication that indicates that the wireless device is synchronized to a reference frequency within an accuracy threshold.

Example 14 is the method of any of Examples 1 to 13, wherein the wireless device is an integrated access and backhaul (IAB) node.

Example 15 is an apparatus including one or more processors and one or more memories in electronic communication with the one or more processors storing instructions executable by the one or more processors to cause the apparatus to implement a method as in any of Examples 1-14.

Example 16 is an apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a first wireless device, comprising: receiving an indication of a frequency synchronization accuracy for a second wireless device; and performing a frequency synchronization based on a frequency of second wireless device and using the indication of the frequency synchronization accuracy for the second wireless device.

Example 19 is the method of Example 18, wherein performing the frequency synchronization includes determining an absolute frequency based on a combination of measurements for multiple synchronization sources including the second wireless device, wherein the first wireless device uses a weight for each synchronization source based on a respective frequency synchronization accuracy level for each of the multiple synchronization sources.

Example 20 is the method of any of Examples 18 and 19, wherein the first wireless device receives the indication of the frequency synchronization accuracy for the second wireless device in a downlink transmission comprising at least one of: system information; a radio resource control (RRC) message; a medium access control (MAC) message; or downlink control information (DCI).

Example 21 is the method of any of Examples 18 to 20, wherein the first wireless device receives the indication of the frequency synchronization accuracy for the second wireless device in an uplink transmission comprising at least one of: a medium access control-control element (MAC-CE); or uplink control information (UCI).

Example 22 is the method of any of Examples 18 to 21, wherein the first wireless device receives the indication of the frequency synchronization accuracy for the second wireless device from a central entity.

Example 23 is the method of any of Examples 18 to 22, wherein the first wireless device receives the indication of the frequency synchronization accuracy for the second wireless device dynamically in response to a change in the frequency synchronization accuracy for the second wireless device.

Example 24 is the method of any of Examples 18 to 23, wherein the first wireless device receives the indication of the frequency synchronization accuracy for the second wireless device periodically or in a semi-static pattern.

Example 25 is the method of any of Examples 18 to 24, wherein the indication of the frequency synchronization accuracy for the second wireless device comprises an index for a quantized accuracy value.

Example 26 is the method of any of Examples 18 to 25, wherein the indication of the frequency synchronization accuracy for the second wireless device comprises synchronization source information for the second wireless device.

Example 27 is the method of any of Examples 18 to 26, wherein the indication of the frequency synchronization accuracy further indicates a capability for use as a frequency synchronization source.

Example 28 is the method of any of Examples 18 to 27, wherein the indication of the frequency synchronization accuracy for the second wireless device comprises a capability, a feature, or a class indication that indicates that the second wireless device is synchronized to a reference frequency within an accuracy threshold.

Example 29 is the method of any of Examples 18 to 28, wherein the frequency synchronization accuracy is based on at least one of: a source synchronization accuracy for at least one synchronization source, a capability of the second wireless device, a link quality to the at least one synchronization source, a number of measurements that the second wireless device uses for the frequency synchronization, or a mobility state of the second wireless device.

Example 30 is the method of any of Examples 18 to 29, wherein the first wireless device is a first integrated access and backhaul (IAB) node and the second wireless device is a second IAB node.

Example 31 is an apparatus including one or more processors and one or more memories in electronic communication with the one or more processors storing instructions executable by the one or more processors to cause the apparatus to implement a method as in any of Examples 18-30.

Example 32 is an apparatus including means for implementing a method or realizing an apparatus as in any of Examples 18-30.

Example 33 is a non-transitory computer readable medium storing instructions executable by one or more processors to cause the one or more processors to implement a method as in any of Examples 18-30.

Example 34 is a method of wireless communication at a central entity in a wireless device network, comprising: receiving an indication of a frequency synchronization accuracy from each of a plurality of wireless devices; and sending frequency synchronization accuracy information for each of the plurality of wireless devices.

Example 35 is the method of Example 34, wherein the central entity receives the indication of the frequency synchronization accuracy dynamically in response to a change in the frequency synchronization accuracy.

Example 36 is the method of any of Examples 34 and 35, wherein the central entity receives the indication of the frequency synchronization accuracy periodically or in a semi-static pattern.

Example 37 is the method of any of Examples 34 to 36, wherein the indication of the frequency synchronization accuracy comprises an index for a quantized accuracy value.

Example 38 is the method of any of Examples 34 to 37, wherein a respective indication of the frequency synchronization accuracy comprises synchronization source information for a respective wireless device.

Example 39 is the method of any of Examples 34 to 38, wherein the indication of the frequency synchronization accuracy further indicates a capability for use as a frequency synchronization source.

Example 40 is the method of any of Examples 34 to 39, wherein a respective indication of the frequency synchronization accuracy comprises a capability, a feature, or a class indication that indicates that a respective wireless device is synchronized to a reference frequency within an accuracy threshold.

Example 41 is the method of any of Examples 34 to 40, wherein the wireless device network is an integrated access and backhaul (IAB) network and the plurality of wireless devices are a plurality of IAB nodes.

Example 42 is an apparatus including one or more processors and one or more memories in electronic communication with the one or more processors storing instructions executable by the one or more processors to cause the apparatus to implement a method as in any of Examples 34-41.

Example 43 is an apparatus including means for implementing a method or realizing an apparatus as in any of Examples 34-41.

Example 44 is a non-transitory computer readable medium storing instructions executable by one or more processors to cause the one or more processors to implement a method as in any of Examples 34-41.

What is claimed is:

1. A method of wireless communication at a wireless device, comprising:
   determining an absolute frequency for the wireless device based on a combination of measurements from at least one synchronization source and a frequency of the wireless device, wherein the absolute frequency corresponds to an assigned frequency;
   determining a frequency synchronization accuracy for the wireless device based on the absolute frequency, the frequency synchronization accuracy indicating a frequency error measurement between an actual frequency of the wireless device and an assigned frequency of the wireless device; and
   transmitting an indication of the determined frequency synchronization accuracy for the wireless device in a downlink or uplink transmission in a semi-static pattern, wherein the indication of the determined frequency synchronization accuracy for the wireless device comprises an index for a quantized accuracy value.

2. The method of claim 1, wherein the frequency synchronization accuracy is determined based on at least one of:
   a source synchronization accuracy for at least one synchronization source,
   a capability of the wireless device,
   a link quality to the at least one synchronization source,
   a number of measurements that the wireless device uses for a frequency synchronization, or
   a mobility state of the wireless device or the at least one synchronization source.

3. The method of claim 1, wherein the wireless device determines the absolute frequency based on the combination of measurements for multiple synchronization sources using a weight for each synchronization source based on a respective frequency synchronization accuracy level for each of the multiple synchronization sources.

4. The method of claim 1, wherein the wireless device transmits the indication of the determined frequency synchronization accuracy for the wireless device to a central entity.

5. The method of claim 1, wherein the wireless device transmits the indication of the determined frequency synchronization accuracy for the wireless device dynamically in response to a change in the frequency synchronization accuracy for the wireless device.

6. The method of claim 1, wherein the indication of the determined frequency synchronization accuracy for the wireless device comprises synchronization source information for the wireless device.

7. The method of claim 1, wherein the indication of the determined frequency synchronization accuracy further indicates a capability for use as a frequency synchronization source.

8. The method of claim 1, wherein the indication of the determined frequency synchronization accuracy for the wireless device comprises a capability, a feature, or a class indication that indicates that the wireless device is synchronized to a reference frequency within an accuracy threshold.

9. An apparatus for wireless communication at a wireless device, comprising:
   a memory; and
   at least one processor coupled to the memory and configured to:
      determining an absolute frequency for the wireless device based on a combination of measurements from at least one synchronization source and a frequency of the wireless device, wherein the absolute frequency corresponds to an assigned frequency;
      determine a frequency synchronization accuracy for the wireless device based on the absolute frequency, the frequency synchronization accuracy indicating a frequency error measurement between an actual frequency of the wireless device and an assigned frequency of the wireless device; and
      transmit an indication of the determined frequency synchronization accuracy for the wireless device in a downlink or uplink transmission in a semi-static pattern, wherein the indication of the determined frequency synchronization accuracy for the wireless device comprises an index for a quantized accuracy value.

10. A method of wireless communication at a first wireless device, comprising:
    receiving an indication of a frequency synchronization accuracy for a second wireless device in a downlink or uplink transmission in a semi-static pattern, the frequency synchronization accuracy indicating a frequency error measurement between an actual frequency of the second wireless device and an assigned frequency of the second wireless device, wherein the indication of the frequency synchronization accuracy comprises an index for a quantized accuracy value; and
    performing a frequency synchronization based on a frequency of the second wireless device and using the indication of the frequency synchronization accuracy for the second wireless device, wherein performing the frequency synchronization includes determining an absolute frequency based on a combination of measurements for multiple synchronization sources including the second wireless device, wherein the absolute frequency corresponds to an assigned frequency.

11. The method of claim 10, wherein the first wireless device uses a weight for each synchronization source based on a respective frequency synchronization accuracy level for each of the multiple synchronization sources.

12. The method of claim 10, wherein the first wireless device receives the indication of the frequency synchronization accuracy for the second wireless device from a central entity.

13. The method of claim 10, wherein the first wireless device receives the indication of the frequency synchronization accuracy for the second wireless device dynamically in response to a change in the frequency synchronization accuracy for the second wireless device.

14. The method of claim 10, wherein the indication of the frequency synchronization accuracy for the second wireless device comprises an index for a quantized accuracy value.

15. The method of claim 10, wherein the indication of the frequency synchronization accuracy for the second wireless device comprises synchronization source information for the second wireless device.

16. The method of claim 10, wherein the indication of the frequency synchronization accuracy further indicates a capability for use as a frequency synchronization source.

17. The method of claim 10, wherein the indication of the frequency synchronization accuracy for the second wireless device comprises a capability, a feature, or a class indication that indicates that the second wireless device is synchronized to a reference frequency within an accuracy threshold.

18. The method of claim 10, wherein the frequency synchronization accuracy is based on at least one of:
- a source synchronization accuracy for at least one synchronization source,
- a capability of the second wireless device,
- a link quality to the at least one synchronization source,
- a number of measurements that the second wireless device uses for the frequency synchronization, or
- a mobility state of the second wireless device.

19. A method of wireless communication at a central entity in a wireless device network, comprising:
- receiving an indication of a frequency synchronization accuracy from each of a plurality of wireless devices in a downlink or uplink transmission in a semi-static pattern, the frequency synchronization accuracy indicating, for the each wireless device of the plurality of wireless devices, a frequency error measurement between an actual frequency of the wireless device and an assigned frequency of the wireless device, wherein the indication of the frequency synchronization accuracy comprises an index for a quantized accuracy value; and
- sending frequency synchronization accuracy information for each of the plurality of wireless devices, wherein the frequency synchronization accuracy information is based on determining an absolute frequency based on a combination of measurements for multiple synchronization sources including the wireless device, wherein the absolute frequency corresponds to an assigned frequency.

20. The method of claim 19, wherein the central entity receives the indication of the frequency synchronization accuracy dynamically in response to a change in the frequency synchronization accuracy.

21. The method of claim 1, wherein the downlink or uplink transmission comprises a medium access control (MAC) message or a medium access control-control element (MAC-CE).

* * * * *